United States Patent

Keck

[15] 3,646,842
[45] Mar. 7, 1972

[54] APPARATUS FOR THE REMOVAL OF CLAY WEB WASTES IN A CLAY-SHAPING MACHINE

[72] Inventor: Dieter Keck, Westphalia, Germany
[73] Assignee: C. Keller Und Co., Laggenbeck, Germany
[22] Filed: Nov. 3, 1969
[21] Appl. No.: 873,545

[52] U.S. Cl. ................................83/104, 25/109, 83/104
[51] Int. Cl. .......................................................B28b 11/14
[58] Field of Search...................25/109, 110, 113, 114, 105; 83/104, 288

[56] References Cited

UNITED STATES PATENTS

| | | | |
|---|---|---|---|
| 885,809 | 4/1908 | Waggoner | 25/113 |
| 615,582 | 12/1898 | Snell | 25/113 |
| 2,261,114 | 11/1941 | Hawk | 25/109 |
| 2,641,042 | 6/1953 | Kopp | 25/113 X |
| 2,120,313 | 6/1938 | Smitmans | 83/288 X |

Primary Examiner—J. Spencer Overholser
Assistant Examiner—Ben D. Tobor
Attorney—Mason, Mason & Albright

[57] ABSTRACT

A cutter for producing green shapes includes a carriage movable reciprocally in the length direction of a green clay web, the carriage mounting a divided cutting table, the dividing gaps of which correspond to one dimension of the shapes to be formed. Cutter wires pass through the green clay web as the carriage is moved forwardly, a mounting wheel of the wires being mounted rotatably on the cutter carriage. When a fresh strip of clay web is received on the cutter table an end portion at the leading edge overhangs the leading edge of the table and is cut off by the leading cutter wire, thus ensuring that at each operation the shapes have identical dimensions.

1 Claim, 1 Drawing Figure

PATENTED MAR 7 1972
3,646,842
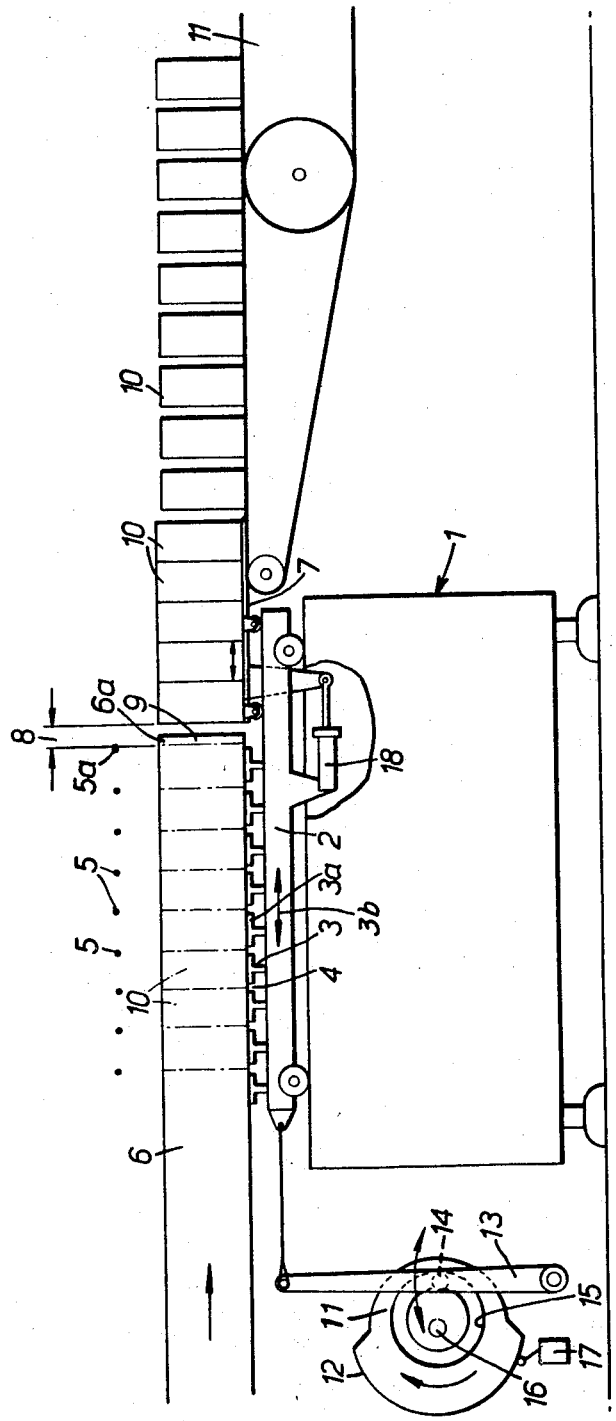
INVENTOR
DIETER KECK
BY
Mason, Mason & Albright
ATTORNEYS

APPARATUS FOR THE REMOVAL OF CLAY WEB WASTES IN A CLAY-SHAPING MACHINE

BACKGROUND OF THE INVENTION

1. Field of the Invention

This invention relates to apparatus for the removal of clay web wastes on a cutter working on the rotary principle.

2. Summary of the Prior Art

Apparatus which divides a clay web by means of a plurality of wires stretched parallel to one another in a wheel or other rotor casing and which displaces thereby the cut green shapes by the following length of clay web from a cutting table of a cutter carriage over a delivery sheet or platform onto a conveyor belt has already been proposed.

In such a previously proposed cutter a plurality of cutting wires is mounted at a predetermined spacing parallel to one another in a wheel or other rotor casing mounted on a cutter carriage in such a manner that during the cutting process there are produced green shapes each of exactly the same dimensions as the others. The cutting wires pass through gaps in the cutting table and reappear above the clay web after one rotation of the wheel or other rotor mounted in the wheel or other rotor housing. Since green shapes of exactly the same dimensions must be produced by the cutting action, it is necessary so to convey a fresh length of the clay web over the cutting table that a leading edge portion of the clay web projects beyond the cutting path of the leading cutter wire. This small projecting piece is left inevitably after each cutting process as a clay web waste and is pushed forward with the remaining green shapes by the forward displacement of the clay web on to a conveyor belt and so also for the further transportation. In this previously proposed apparatus it is, in practice, disadvantageous that the clay web waste arrives with the remaining green shapes for further processing since this is undesirable in the subsequent working processes, for example turning of the green shapes by a spider, and hinders automatic operation of the subsequent conveyance of the green shapes.

An object of the present invention is to overcome the disadvantages of the previously proposed apparatus and to provide an apparatus for the removal of clay web wastes from a cutter, which makes possible the removal of the clay web wastes from the series of remaining green shapes.

SUMMARY OF THE INVENTION

According to the present invention there is provided in apparatus for producing green shapes from a clay web comprising a rotary cutter including a cutter table, a cutter carriage mounting said table, cutter means for cutting the clay web into green shapes of required dimensions and a waste portion at the leading edge of the web, means for reciprocating the cutter carriage along the path of the clay web, delivery platform means movably mounted longitudinally of the carriage at the delivery end of the table, and means for reciprocating the platform means thereon, whereby on completion of a cutting operation the clay waste portion can fall through a gap produced between the cutter table and the platform means said gap being thereafter closed to allow the required green shapes to pass along the delivery platform, said means for reciprocating the carriage and for moving the platform means thereon, comprising a rotary disc having an annular groove therein, a pivotal lever carrying means engaging in said annular groove, means securing the lever to the cutter carriage, a cam mounted peripherally of the rotary disc, a switch actuable by the cam, and a cylinder and piston connected respectively to the carriage and to the platform and operable by said switch, rotation of said disc serving to reciprocate the carriage and actuation of the switch serving to space the platform from the carriage to form a gap through which on completion of a cutting operation the clay waste portion can fall.

The apparatus in accordance with the invention has the advantage that the clay web waste from which the series of remaining green shapes are formed is removed immediately after the cutting operation and thereby automatic operation of the further handling process of the remaining green shapes is no longer hindered.

BRIEF DESCRIPTION OF THE DRAWING

The sole FIGURE of the drawing is a diagrammatic side elevation of one embodiment of clay web cutting apparatus in accordance with the invention.

DESCRIPTION OF THE PREFERRED EMBODIMENT

A cutter 1, has a reciprocal cutter carriage 2 which, in turn, carries a cutting table 3, movable as indicated by a double-headed arrow 3b, which consists of plates 3a corresponding to the required individual width of the green shapes 10 to be formed, between which plates, gaps 4 are provided. Cutter wires 5 are stretched parallel to one another in a wheel or other rotor housing (not illustrated in the drawing) and perform during the cutting process a circular movement so that they pass through the clay web 6 and the gaps 4 of the cutting table 3 and after the completion of one revolution of the wheel or rotor in the wheel housing the wires reappear above the clay web 6 ready for the next cutting operation.

The wheel housing is secured to the cutter carriage 2 and is thus synchronized with the movements of the cutter carriage 2 in the direction of movement of the web. Furthermore, a delivery sheet or platform 7 is mounted on the cutter carriage 2, which is reciprocally displaceable on the cutter carriage 2 by a mechanism so that a gap 8 can be produced or closed between the cutter table 3 and the delivery or platform sheet 7.

This mechanism includes disc 11 connected with an actuating lever 13 coupled with the cutter carriage 2 through a roller 14 mounted on the lever 13, which slides in a lateral groove of the disc 11. The disc 11 rotates clockwise about a spindle 16 and moves the actuating lever 13 and thus the cutter carriage to and fro. The disc 11 is fitted with a cam 12, which actuates a switch 17. By actuation of the switch 17 the piston of a cylinder 18 is moved to the outer dead center position, which piston and cylinder assembly is secured on the one hand to the cutter carriage 2 and on the other hand to the transfer or delivery platform 7, so that the delivery platform performs a movement relative to the cutter carriage 2 and causes a gap 8 between the cutter table and it, in order to allow the clay waste 9 to drop.

The manner of operation of the apparatus in accordance with the invention is as follows:

The clay web 6 slides over the cutter table 3 into a position in which a leading edge portion 6a of the clay web 6 extends to the small degree beyond the cutting path of the leading cutting wire 5a. This overhanging portion 6a of the clay web is necessary for each cutting operation in order to maintain the dimensions of the green shapes 10 equal.

The cutting operation is now effected in which the cutter carriage 2 moves in the direction of movement of the clay web 6 and is therefore adapted to the speed of the clay web 6. If the speed is achieved then the cutter wires 5 separate the green shapes 10 by exactly vertical cuts through the clay web 6. At the same time as the commencement of movement of the cutter carriage 2 the delivery sheet or platform 7 is also set in motion on the cutter carriage 2 by the piston and cylinder assembly 18 and forms a gap 8 between the platform and the cutter table 3, which gap is of sufficient size that the clay web portion 6a cut off can fall below as waste.

After the cutting process has been effected, the cutter carriage 2 is returned to its initial position since the switch 17 is no longer closed and the delivery sheet or platform 7 closes the gap 8, so that the green shapes 10 can be displaced by the following clay web 6 from the cutter table 3 over the delivery sheet 7 and on to a conveyor 11.

I claim:

1. In apparatus for producing green shapes from a clay web comprising
   a rotary cutter including
      a cutter table, a cutter carriage mounting said table,
cutter means for cutting the clay web into green shapes of required dimensions and a waste portion at the leading edge of the web,
delivery platform means movably mounted longitudinally of the carriage at the delivery end of the table, and
means for reciprocating the carriage along the path of the clay web and for moving the platform means thereon, said means for reciprocating the carriage and for moving the platform means thereon, comprising
a rotary disc having an annular groove therein,
a pivotal lever carrying
means engaging in said annular groove,
means securing the lever to the cutter carriage,
a cam mounted peripherally of the rotary disc,
a switch actuable by the cam, and
a cylinder and piston connected respectively to the carriage and to the platform and operable by said switch,
rotation of said disc serving to reciprocate the carriage and actuation of the switch serving to space the platform from the carriage to form a gap through which on completion of a cutting operation the clay waste portion can fall.

* * * * *